Dec. 24, 1968   J. ANTHONY   3,417,498
MOBILE DISPLAY DRIVE MECHANISM
Filed April 22, 1966
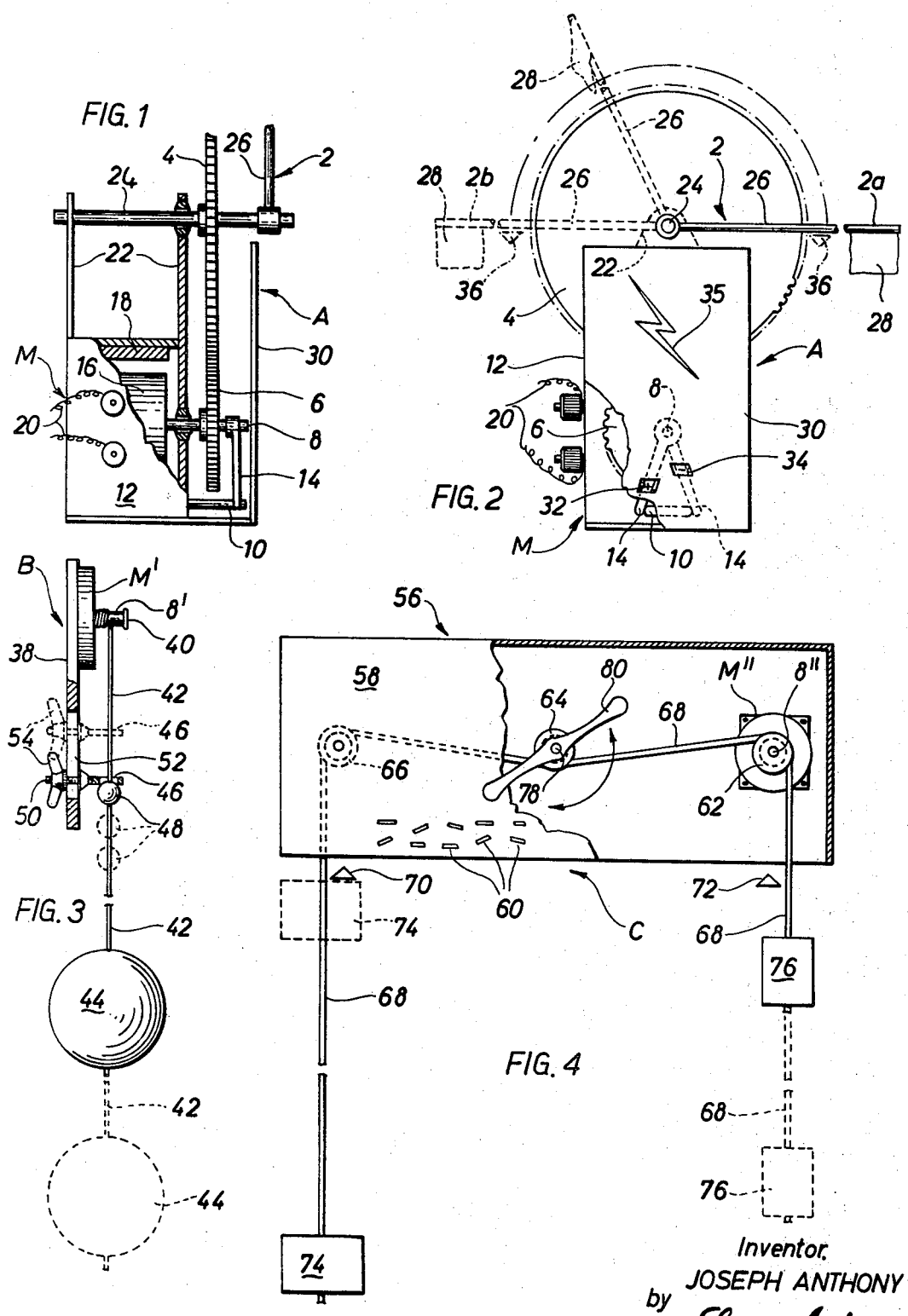
Inventor.
JOSEPH ANTHONY
by *Leon Arthurs*
Agent.

United States Patent Office 3,417,498
Patented Dec. 24, 1968

3,417,498
MOBILE DISPLAY DRIVE MECHANISM
Joseph Anthony, 577 Kingswood Place,
Burlington, Ontario, Canada
Filed Apr. 22, 1966, Ser. No. 544,606
9 Claims. (Cl. 40—30)

ABSTRACT OF THE DISCLOSURE

A mobile display having a self-starting electric motor automatically reversible, upon physical impedance of a thrust stroke by an adjustable abutment, to reverse the direction of movement of a display element drivably coupled to the motor; said abutment being selectively adjustable relative to the display element for varying the amplitude of movement thereof.

The present invention relates generally to low power mobile displays such as have one or more moving elements for attracting attention at the point of sale and relates in particular to a drive mechanism for such mobile displays.

Before discussing the invention in detail a few remarks are deemed expedient regarding display devices in general. It will be understood that these devices, and particularly display devices intended for use by retailers, are usually mass-produced and must be capable of production at a very low cost in order to render them an economically feasible form of advertisement. On this premise it will be apparent that any mechanism for inducing movement in a display device must be exceedingly simple since the cost of such mechanism is, of course, in direct proportion to the complexity thereof.

The invention is particularly concerned with such displays in which the main action is alternating, that is to say in which the specific display member or members stroke alternately in two or more directions. In the ordinary prior drive mechanisms for producing these effects the amplitude of movement was relatively short, although the prior art did also contain various more or less expensive power transmission means of indeterminate efficiency for increasing said amplitude or converting the thrust of the drive motor between rotary, linear, reciprocating, oscillating and other movements.

Accordingly it is a principal object of the invention to provide a mobile display having a simple and economical drive mechanism for inducing alternating movement in said display.

It is a related object of the invention to provide in a mobile display drive mechanism which is self-reversible after a predetermined quantum of driving motion in one direction.

It is a further object of the invention to provide drive mechanism as aforesaid including a bi-directional motor which is drivable at a constant speed for a predetermined period in one direction and then for a predetermined period in the opposite direction.

It is a further object of the invention to provide drive mechanism as aforesaid including a motor having a thrust stroke of variable amplitude in each of two directions.

It is a further object of the invention to provide drive mechanism as aforesaid having a thrust stroke of variable amplitude, said amplitude being extensible substantially indefinitely.

It is a further object of the invention to provide drive mechanism as aforesaid including a motor drivable first through more than one complete revolution in one direction and then through more than one complete revolution in an opposite direction.

It is a further object of the invention to provide drive mechanism as aforesaid including a bi-directional motor which tends to switch its thrust from one direction to the other when its thrust in one direction is impeded.

It is a further object of the invention to provide drive mechanism as aforesaid including a flexible transmission for operatively coupling said impeller to a mobile display.

It is a further object of the invention to provide drive mechanism as aforesaid including transmission means for coupling said impeller to a mobile display and for transmitting linear reciprocatory thrust to said display.

It is a further object of the invention to provide a drive mechanism as aforesaid including an oscillatable impeller.

It is a still further object of the invention to provide drive mechanism as aforesaid including means for translating oscillating motion of said impeller into linear reciprocating motion of said mobile display.

The foregoing and other objects are achieved in accordance with the invention by the provision of a mobile display including a self-starting bi-directional motor, which may be of the synchronous type used in electric clocks. Said motor includes an impeller couplable by transmission means to a display element which is movable between two display positions, the motor being energizable to thrust said impeller in either of two directions. The motor is characterized by a tendency to switch from one direction of thrust to the other when its thrust in said one direction is impeded. In accordance with the invention the drive mechanism also includes means for impeding the thrust of said motor at intervals which may be expressed in terms of amplitude of movement or of duration of movement, inducing cyclical switching of the thrust from one direction to the other and procuring driving of the display element to and fro between said display positions.

The invention will now be described in greater detail by way of illustration with reference to the accompanying drawing wherein:

FIG. 1. is a side elevational view, partly broken away and partly in section of a mobile display in accordance with the invention;

FIG. 2 is a front elevational view, partly broken away, of the mobile display shown in FIG. 1;

FIG. 3 is a side elevational view, partly sectioned, of another form of mobile display as contemplated by the invention, and FIG. 4 is a front elevational view, partly broken away, of yet another form of mobile display as contemplated by the invention.

A mobile display A in accordance with the invention is shown in FIGS. 1 and 2 and includes element 2 movable between two attention-catching or display positions indicated respectively at 2a and 2b in FIG. 2.

The display A is powered by a motor M drivingly coupled to the display element 2 by a transmission, such as gears 4 and 6. The motor M is capable of exerting thrust in either of two directions through a drive shaft or impeller 8 as will be explained in greater detail hereinafter.

Means is provided for impeding the thrust of the motor M in each of said directions and may comprise a stop 10 carried by the motor housing 12 against which stop a radial arm 14 non-rotatably mounted on the shaft 8 may abut at the end of each thrust stroke of the motor.

The general construction of the motor M does not form a part of the present inventive idea and accordingly will not be described in detail. Suffice it to say that the motor should be a self-starting bi-directional motor capable of delivering thrust strokes in either of two directions and having a tendency to switch from one stroke to the other when said one stroke is blocked or impeded, whereby thrust strokes may be delivered alternately in each of said directions. The term "self-starting" as used herein is intended to indicate that the motor develops thrust of its own accord as soon as it is connected to a source of power. Small inexpensive electric motors having these characteristics are well known, the synchronous motors used to power electric clocks being of this type although in this case the motor is generally required to drive in one direction only and may be equipped with a ratchet or similar device which immediately arrests movement in the undesired direction making the motor effectively unidirectional.

The motor M is of the synchronous type and comprises a rotor and a stator schematically represented at 16 and 18 respectively, the rotor 16 carrying the impeller 8. In accordance with conventional practice the stator 18 may include a plurality of field poles (not shown) whereof alternate poles have cyclically alternating instantaneous opposite polarities when energised by an A.C. current.

The motor M may be connected to an A.C. power source by leads 20 and when energised will develop a thrust stroke in either a clockwise or an anticlockwise direction, depending upon the initial polarities of the field poles, the starting impulse or torque of the motor being thus to all intents and purposes indeterminate in direction. The impeller rotates in one of said directions until thrust of the motor is impeded by abutment against the stop 10 of the radial arm 14 which forms, as it were, an integral extension of the impeller.

Thereafter the next change in polarities of the field poles will induce reverse rotation of the rotor 16 and the impeller 8, until the arm 14, having turned through less than 360°, again abuts against the stop 10 and reversal of the motor is again induced. The impeller 8 thus executes a back and forth oscillating movement through approximately 315° in the illustrated embodiment. The term "oscillating" as used herein is intended to include any alternating rotational movement in opposite directions.

The display element 2 is carried by a pair of upward extensions 22 of the motor housing 12. A shaft 24 is journalled in the extensions 22 and has secured thereto a staff 26 and the gear 4. The staff 26 may carry a banner 28. The gear 4 meshes with the gear 6 which is mounted on the impeller 8. The gears 4 and 6 may be in such ratio that when the motor M is energised the display element 2 will execute an oscillating movement through an arcuate path of 180 degrees between the positions 2a and 2b as illustrated by the chain dotted line in FIG. 2.

The radial arm 14 may itself constitute a display element carrying display matter represented by the signs "+" and "—" in FIG. 2. A display panel 30 having windows 32 and 34 therein and bearing display matter 35 may be mounted in front of the motor M. At the end of one stroke of the motor M the arm 14 adopts a display position wherein the sign "+" is visible through the window 32 and at the end of an oppositely directed stroke the arm 14 adopts a display position wherein the sign "—" is visible through the window 34.

As shown in broken line in FIG. 2 a pair of stops 36 may be positioned for engagement by the staff 26 at opposite ends of its travel. The stops 36 may be made resilient for damping the assembly as a means for overcoming whip. In this case the arm 14 and stop 10 may be omitted from the drive mechanism since the thrust stroke of the motor M in one direction is, of course, impeded as soon as the staff 26 abuts against either of the stops 36, whereby reversal of the motor is initiated.

A mobile display B embodying a modification of the invention is illustrated in FIG. 3 wherein 38 designates a display panel (seen from one side) to the rear of which a motor M' is attached. The motor M' has the same operating characteristics as the motor M and includes a drive shaft 8' which is flanged at 40. A flexible cord 42 for transmitting the thrust of the motor M' to a display element 44 is anchored to the shaft 8' and is windable thereon as shown in the drawing. The cord 42 depends from the shaft 8', passing through an eye 46 secured to the display panel 38, and has the display element 44 attached to its lower end. Between the display element 44 and the eye 46 the cord 42 carries a stop 48 of such size that it cannot pass through the eye 46. As shown the stop 48 is a generally spherical bead adjustably mounted on the cord 42. When the motor M' is energised the cord 42 will be either wound on or unwound from the shaft 8'. If the cord 42 is wound on the shaft 8' then the display element 44 and stop 48 rise until the latter abuts against the eye 46 which prevents further upward movement thereof, the element 44 being then located at one display position thereof.

Movement of the cord 42, is thereby momentarily arrested and reversal of the motor M' is initiated. As the shaft 8' begins to rotate in the opposite direction the cord 42 unwinds therefrom and the display element 44 is lowered to the dotted line display position of FIG. 3. When the cord 42 has fully unwound from the shaft 8' it begins to rewind thereon in the opposite sense and consequently the display element 44 and stop 48 again rise until the latter abuts against the eye 46 and once more initiates reversal of the motor M'. In this way oscillating movement of the shaft 8' is translated into linear reciprocating movement of the display element 44.

The position of the stop 48 on the cord 42 may be adjusted as suggested by the broken line representations in FIG. 3 so as to vary the amplitude of movement of the cord and thereby to vary the amplitude of the stroke of the motor which may include more than one complete revolution of the shaft 8'. Alternatively or in addition the eye 46 may be adjustable vertically of the panel 38 as shown in FIG. 3, having a flanged and threaded shank 50 extending through an elongated slot 52 in the panel 38 for engagement by a wing nut 54. It will be clear that if the speed of the motor M' is constant then adjustment of the stop 48 and/or of the eye 46 will also regulate the duration of the motor stroke in either direction.

Yet another embodiment of the invention is illustrated in FIG. 4 which shows a mobile display C including a box-like housing 56 of which the front wall 58 may comprise a display panel carrying display matter 60. Within the housing 56 is mounted a motor M", which is similar to the motor M' but with the flange 40 omitted and having a pulley 62 mounted on its drive shaft 8". Two further pulleys 64 and 66 are rotatably mounted in the housing 56 and a flexible cord 68 is drivably engaged with each of the wheels 62, 64 and 66, said cord 68 after passing round the wheels 62 and 66 depending through the open lower end of the housing 56 adjacent to stops 70 and 72. Opposite ends of the cord 68 are connected to display elements 74 and 76 respectively and the pulley 64 is fixedly mounted on a shaft 78 having one end journalled in and projecting through the front wall 58 of the housing 56. The projecting end of the shaft 78 may have a rotatable display element 80 secured thereto.

When the motor M" is energised the cord 68 will be driven in one direction by the pulley 62 causing one of the display elements 74 and 76 to be raised and the other to be lowered. Assuming that the display element 74 is raised, when said element abuts against the stop 70 the thrust of the motor M" is impeded and reversed to drive the cord 68 in the opposite direction until the other display element 76 abuts against the stop 72 and causes further reversal of the motor M". The positions of the display elements when reversal of the motor takes place is illustrated in dotted lines in FIG. 4. These may be termed display positions of the respective elements 74 and 76, each element having of course another display position which it attains when the element 76 abuts against the stop 72. It will be appreciated that as the cord 68 reciprocates during the cycle outlined above it will drive the pulley 64, the shaft 78 and the display element 80.

To sum up the invention seeks to provide in a mobile display drive mechanism including a motor having an impeller operatively coupled to a movable display element and means for procuring cyclical reversal of the motor by impeding the thrust thereof at predetermined intervals, said motor being energisable to develop thrust strokes in either of two directions. Said cyclical reversal of the motor procures alternating to and fro movements of the display element between two display positions.

Although several embodiments of the invention have been described herein and illustrated in the accompanying drawings it should be understood that such embodiments are by way of example only and that the invention is in no way limited thereto but is deemed to cover all embodiments and modifications falling within the scope of the claims now following.

What I claim is:
1. A mobile display including:
   At least one display element movable to and fro through a plurality of display positions;
   A motor capable of delivering thrust strokes in two directions alternately and having a tendency to switch from one stroke to the other when either of said strokes is impeded;
   Means for coupling said motor to said display element for driving it through said display positions;
   Means for impeding the said thrust strokes each time said display element reaches a selected display position inducing cyclical switching of the motor from one stroke to the other and procuring driving of said display element to and fro through said display positions, and
   Adjustment facilities for varying the amplitude of said strokes.
2. A mobile display as set forth in claim 1 including:
   an impeller constituting the element by which said motor delivers its thrust strokes, and
   a transmission coupling said impeller to said display element for driving it through said display positions.
3. A mobile display as set forth in claim 1 including:
   an impeller constituting the element by which said motor delivers its thrust strokes;
   a transmission coupling said impeller to said display element for driving it through said display positions;
   said impeding means being adjustable to vary the amplitude of each stroke of said impeller.
4. A mobile display as set forth in claim 1 including:
   an impeller constituting the element by which said motor delivers its thrust strokes;
   a transmission coupling said impeller to said display element for driving it through said display positions;
   said motor having a constant speed and the duration of each stroke of said impeller being variable by means of said adjustment facilities.
5. A mobile display as set forth in claim 1 including:
   an oscillatable impeller constituting the element by which said motor delivers its thrust strokes, and
   a transmission coupling said impeller to said display element for driving it through said display positions.
6. A mobile display as set forth in claim 1 including:
   an impeller constituting the element by which said motor delivers its thrust strokes, and
   a transmission coupling said impeller to said display element for driving it through said display positions;
   said display element being linearly reciprocable during its movement.
7. A mobile display as set forth in claim 1 including:
   an impeller constituting the element by which said motor delivers its thrust strokes, and
   a transmission coupling said impeller to said display element for driving it through said display positions;
   said impeller being oscillatable and its oscillations being translated by said transmission into linearly reciprocating movements of said movable display element.
8. A mobile display as set forth in claim 1 including:
   an impeller constituting the element by which said motor delivers its thrust strokes;
   a transmission coupling said impeller to said display element for driving it through said display positions;
   at least one of said strokes including more than one complete rotation of said impeller in one direction.
9. A mobile display as set forth in claim 1 including:
   a rotatable shaft constituting an impeller by which said motor delivers its thrust strokes, and
   a flexible cord constituting the said transmission and coupling said rotatable shaft to said display element for driving said element through said display positions.

References Cited
UNITED STATES PATENTS 3,315,389   4/1967   Drueck _____ 40—53

EUGENE R. CAPOZIO, *Primary Examiner.*

R. CARTER, *Assistant Examiner.*

U.S. Cl. X.R.

40—106.41; 46—45